May 19, 1959 — S. V. FENICCHIA — 2,887,170
GARDENING TOOL
Filed Feb. 11, 1957
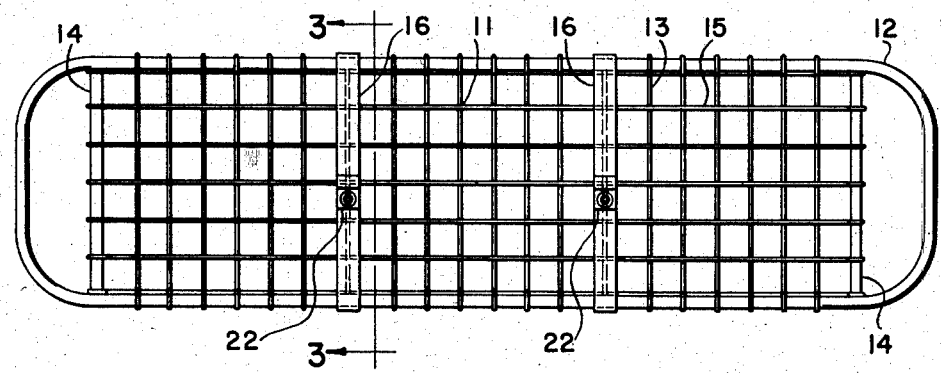
Fig-1
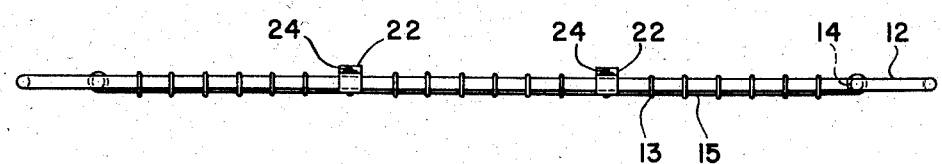
Fig-2
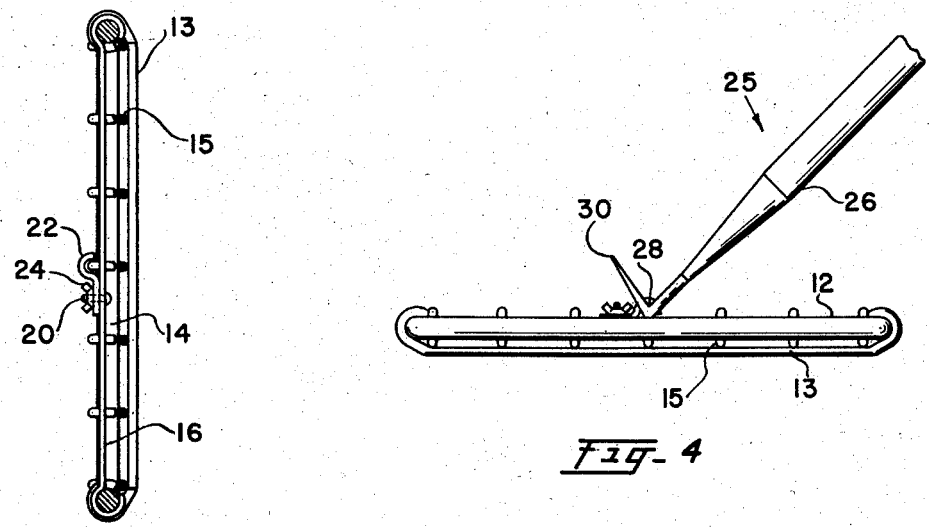
Fig-3
Fig-4
INVENTOR.
STEPHEN V. FENICCHIA
BY
Attorney United States Patent Office 2,887,170
Patented May 19, 1959

2,887,170

GARDENING TOOL

Stephen V. Fenicchia, Rochester, N.Y.

Application February 11, 1957, Serial No. 639,315

1 Claim. (Cl. 172—379)

This invention relates to a gardening tool particularly for use in landscape gardening.

Many tools are available to the average gardener, whether landscape gardener or home owner, for turning up and for breaking open the soil. However, the only hand tool ordinarily available for smoothing a small patch of soil is the common hand rake. The rake is reasonably efficient for removing lumps from the soil, and for breaking up lumps of soil, but actually is not very satisfactory for smoothing and fine-grading a small patch of ground to prepare it for seeding. A man, who is not accustomed to handle a rake, finds it impossible to get the soil fine enough or level enough, or smooth enough, with a rake for a satisfactory lawn-seeding or reseeding job; he will experience difficulty in eliminating ridges and lumps. A drag can be used to smooth and level a large piece of ground; but a drag requires at least two men to handle it. Moreover, it is not suitable for use in preparing the lawn around a home for seeding or reseeding; a drag cannot be manipulated close enough to the house.

One object of the present invention is to provide a tool for fine-grading, leveling, and smoothing the soil that requires no particular skill to manipulate it, that is suitable for working a relatively small area, and that can be handled by one man.

Another object of the invention is to provide a tool of the type described that can be detachably mounted on a rake, to permit using the tool and the rake alternately or at will.

Another object of the invention is to provide a tool of the character described that will be inexpensive to manufacture and very convenient to use and to store.

A preferred embodiment of the invention is illustrated in the drawing. In the illustrated embodiment, the tool comprises a lattice of interconnected rigid wires that are secured within a rigid frame. While the frame may be of any shape desired, a generally rectangular shape is preferred. Parallel bars are secured across the frame to connect the two longitudinal sides of the frame and to brace them.

In the preferred embodiment of the invention, the grading tool is mounted detachably on the head of a conventional hand rake so that the grading tool may pivot about a horizontal axis. To use the device, the grading tool is placed flat on the ground, with the teeth of the rake pointing upward. The handle of the rake is then moved to and away from the user, to cause the lattice-work, of which the tool is made, to move over the surface of the soil. This lattice-work smooths and grades the soil to an even elevation. The results obtained are far superior to those normally achievable with a conventional rake.

When not in use, the grading tool can be detached from the rake, and since it is substantially flat, it can be stored very conveniently in a small space. Because of its simple structure, it is inexpensive to manufacture and hence can be made available to the public at a very low cost.

The details of construction of the grading tool, and the method of its operation, can be best understood by a consideration of the detailed description thereof that follows, considered with the drawing.

In the drawing:

Fig. 1 is a top plan view of a tool constructed according to one embodiment of the invention;

Fig. 2 is a front elevation thereof;

Fig. 3 is a section on the line 3—3 of Fig. 1, looking in the direction of the arrows; and Fig. 4 is a side elevation showing the tool pivotally mounted on a hand rake, in its position of use.

Referring now in detail to the drawing, a generally rectangular grading tool is shown comprising a lattice 10 made of criss-crossed heavy wires 13 and 15 that are welded or otherwise connected to one another at points 11, where they cross. The lattice 10 may be secured to the frame 12, by twisting the ends of the wires 13, that extend widthwise of the frame, to the two longitudinal sides of the frame, or by welding these wires to the frame. The frame 12 may be made of heavy rod stock that is bent to shape, or may be formed from any other convenient material in any convenient manner.

Two brace rods or bars 14 are mounted widthwise of the frame and are welded or otherwise secured between the two opposite longitudinal sides of the frame to which the wires are secured. The wires 15 of the lattice work 10, that extend lengthwise of the frame 12, are secured to the two brace rods 14, as by welding them to these rods 14 or twisting their ends around these rods. These longitudinal wires 15 of the lattice work preferably terminate at rods 14.

A pair of parallel straps or bars 16 are also mounted widthwise on the frame 12 and are secured to the two opposite longitudinal sides thereof. A pair of clamps 22 are mounted on these bars, substantially along the transverse center line of the bars. Each clamp 22 is secured to the associated bar 16 by a bolt 20 that is adapted to pass through an aperture in the bar, and by a wing nut 24 that threads on the bolt.

In the embodiment of the invention shown, the grading tool is clamped by clamps 22 to the head of a conventional hand rake. This rake has a handle 26, and a rake head that projects laterally on each side of the handle 26, and that consists of a rod 28 and of a plurality of parallel, pointed teeth 30 that project from the rod 28. To secure the grading tool to the rake, the rake head is engaged against the straps 16, with its teeth 30 pointing away from the grading tool. The jaw of each clamping member 22 is inserted between a pair of the teeth 30, and engaged around the rod 28. Then the wing nuts 24 are tightened on their bolts 20 to fasten the tool on the rake head. Preferably, the jaws of the clamping members 22 are so proportioned that when the wing nuts are fully tightened, there is sufficient free play so that the grading tool is free to pivot about the rod 28. The straps 16 may be mounted for adjustment longitudinally on the frame 12 so as to readily register the clamping members 22 with the spaces between adjacent teeth of the rake with which the grading tool is to be used.

To use the device to fine-grade, and smooth or level the soil, the grading tool is placed flat on the ground, as shown in Fig. 4. The rake handle 26 is then pushed toward and away from the user, to cause the grading tool to move back and forth over the surface of the soil. The wire lattice 10 makes direct contact with the soil, and is very effective in forming a smooth, fine-graded, level surface over the entire area.

When the area has been smoothed, the grading tool is removed from the rake by loosening the clamps, and it can be stored away conveniently in a very small space.

Obviously, the device is not only a very useful tool to the professional landscape gardener but is also very convenient for smoothing relatively small areas such as would be encountered by the home gardener in reseeding a bare section in an established lawn.

While the grading tool may be mounted, as shown, on a rake for use, obviously the tool may be provided with its own handle, connected to the tool so that the tool can pivot about a horizontal axis. In use this tool will be manipulated as described above.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claim.

Having thus described my invention what I claim is:

A manually-operable combination tool for grading the soil by a back and forth movement comprising a frame, a rigid metallic lattice mounted on said frame to lie beneath said frame and disposed substantially in a single plane, a pair of parallel straps secured across said frame above said lattice, a rake having a handle, an elongate rake head mounted at an end thereof to project laterally to each side of said handle, and having a row of teeth projecting therefrom, and a pair of clamps pivotally securing said frame to said rake head on the side thereof opposite said row of teeth to permit pivotal movement of said member about an axis at a right angle to said handle, said clamps being secured around said rake head between different pairs of said teeth whereby said teeth limit lateral movement of said clamps.

References Cited in the file of this patent

UNITED STATES PATENTS

| | | |
|---|---|---|
| 1,105,815 | Milleman | Aug. 4, 1914 |
| 1,127,233 | Hadford | Feb. 2, 1915 |
| 1,184,856 | Johnson | May 30, 1916 |
| 1,209,072 | Temte | Dec. 19, 1916 |
| 1,445,506 | Gorhy | Feb. 13, 1923 |
| 1,569,421 | Coelho | Jan. 12, 1926 |
| 1,809,743 | Chase | June 9, 1931 |
| 2,010,325 | Sawyer | Aug. 6, 1935 |
| 2,854,912 | Best | Oct. 7, 1958 |

FOREIGN PATENTS

| | | |
|---|---|---|
| 446,508 | Great Britain | Apr. 5, 1935 |